US006600235B2

(12) United States Patent
Mittermeier et al.

(10) Patent No.: US 6,600,235 B2
(45) Date of Patent: Jul. 29, 2003

(54) EMERGENCY LOCKING SYSTEM AND METHOD

(75) Inventors: Rainer Mittermeier, Landshut (DE); Andreas Holzinger, Unterschleissheim (DE)

(73) Assignee: Bayeriche Motoren Werke Aktiengesellschaft, Munich (DE)

( * ) Notice: Subject to any disclaimer, the term of this patent is extended or adjusted under 35 U.S.C. 154(b) by 2 days.

(21) Appl. No.: 09/864,167

(22) Filed: May 25, 2001

(65) Prior Publication Data

US 2001/0045775 A1 Nov. 29, 2001

(30) Foreign Application Priority Data

May 26, 2000 (DE) .......................................... 100 26 126

(51) Int. Cl.[7] .................................................... B60L 1/00
(52) U.S. Cl. ........................... 307/9.1; 318/286; 701/36
(58) Field of Search .......................... 307/9.1, 119, 116; 318/476, 477, 286; 701/36

(56) References Cited

U.S. PATENT DOCUMENTS

| | | | | | |
|---|---|---|---|---|---|
| 5,347,755 | A | * | 9/1994 | Jaster et al. | 49/118 |
| 5,422,552 | A | * | 6/1995 | Parisi | 318/16 |
| 5,530,329 | A | * | 6/1996 | Shigematsu et al. | 318/469 |
| 5,592,060 | A | * | 1/1997 | Racine et al. | 200/61.43 |
| 5,949,207 | A | * | 9/1999 | Luebke et al. | 318/446 |
| 6,031,348 | A | * | 2/2000 | Fehr et al. | 318/283 |
| 6,150,784 | A | * | 11/2000 | Nagaoka | 318/467 |
| 6,426,604 | B1 | * | 7/2002 | Ito et al. | 160/293.1 |

* cited by examiner

*Primary Examiner*—Brian Sircus
*Assistant Examiner*—Sharon A. Polk
(74) *Attorney, Agent, or Firm*—Crowell & Moring LLP

(57) ABSTRACT

An emergency locking system and method is provided for power windows and/or power sun roofs in motor vehicles. It incorporates the feature that an obstruction safety interlock continues to be active even during the emergency locking mode in emergency situations and can only be disabled under specific conditions. In this way, injuries caused by a lack of information or improper operation can largely be excluded.

36 Claims, 2 Drawing Sheets

EMERGENCY LOCKING SYSTEM AND METHOD

BACKGROUND AND SUMMARY OF THE INVENTION

This application claims the priority of German Application No. 100 26 126.4, filed May 26, 2000, the disclosure of which is expressly incorporated by reference herein.

The present invention relates to a device as well as a method for securing a motor vehicle in emergency situations. In particular, the invention relates to an emergency locking system and method for closing power windows and power sunroofs in motor vehicles.

Today, motor vehicles are frequently equipped with power window opening systems, which open and close the windows of a motor vehicle by actuating a switch. In using such a vehicle, situations may occur in which the persons inside the vehicle must protect themselves against attacks from outside the vehicle by closing and locking the motor vehicle quickly. This may be necessary, for example, during brief stops at traffic lights and in slow-moving or stopped traffic since such situations oftentimes are used for attacks on motor vehicles and for stealing valuables located inside motor vehicles.

So-called "lock-unlock switches" are known for locking doors in such situations. With such a switch, a centrally controlled door lock can be triggered so that the vehicle doors as well as possibly the interlocking device for the trunk are locked. Since in such a situation the locking of the windows as well as of the sunroof may also become necessary, so-called emergency locking functions are well known for power windows and power sunroofs. However, the problem with these familiar emergency locking functions is that the obstruction safety interlock, which is generally provided on power windows and power sunroofs, is disabled when the emergency locking function is actuated.

On systems known so far, the obstruction safety interlock for windows and sunroofs is active in automatic mode (touch-control operation) as well as upon actuation in a first locking position (manual) and during the comfort-locking mode via e.g. a remote control. This means that in the case of an obstruction the window pane automatically reverses downward, either partially or completely. When the locking button is permanently pressed in a second locking position or against a mechanical stop, the emergency locking function (panic mode) is activated and the obstruction safety interlock is disabled. This way the passengers have the possibility to perform an emergency locking process of the windows and of the sunroof without the obstruction safety interlock by manually actuating the operating switches. This causes in particular the danger of injuries due to body parts being squeezed in between. Due to the design of the operating switches with two locking positions in each direction (open and close manually or by touch control), the window pane is often closed by over-pressing and holding the switch unconsciously. Usually, the passengers are not aware that in such situations the obstruction safety interlock is inactive, i.e. the emergency function is active. This creates dangerous situations for passengers and passerbys.

A familiar emergency locking system is disclosed, for example, in European Patent document EP-A-856 629. In accordance with this document, an operating field with four switches is provided in an area accessible to the driver, with this field being connected with an obstruction safety interlock device for the windows in all doors. By actuating the emergency switch, all windows can be jointly brought into the closed and locked position while circumventing or disengaging the obstruction safety interlock device. Thus, this device as well has the above-mentioned disadvantages.

The present invention is based on the task of creating an improved emergency locking system and method for closing and locking windows and sunroofs on a motor vehicle. In particular, the invention is intended to avoid the disadvantages and risks for people that are associated with these familiar systems.

According to the present invention, the unintentional triggering of the emergency function by over-pressing and holding down the operating switch at the stop is avoided. This feature can be realized both on vehicles where only a few of the windows are power-driven and on vehicles where all windows, including the sunroof, can be actuated automatically. Generally, the operating areas for the windows are located in vehicles in a switching block in the driver's door, with additional switches in the appropriate doors of the windows that are intended to be opened as well as in the vicinity of the sunroof. The invented emergency locking system and method preferably has such a design that an effective obstruction safety interlock feature is available on all power windows and power sunroofs.

The invention is based on the basic idea that the obstruction safety interlock can be operated both in the standard state for a normal locking process and in a modified state for an emergency locking process. This drastically reduces the risk of injuries to passengers located in the vehicle. Even in the absence of knowledge of the operating instructions and/or the operation of the actuation device, dangerous conditions can be avoided for the passengers and passerbys. Beyond that, no functional restrictions exist compared to familiar obstruction safety interlock systems, i.e. potential attackers can still be locked out. Frozen and/or jammed panes can also be released. Another advantage is that hardly any hardware modifications are required compared to familiar systems for the control device. In this way, the costs for a production environment remain nearly unchanged, while simultaneously increasing security and safety.

Other objects, advantages and novel features of the present invention will become apparent from the following detailed description of the invention when considered in conjunction with the accompanying drawings.

DETAILED DESCRIPTION OF THE DRAWINGS

Figure 2:
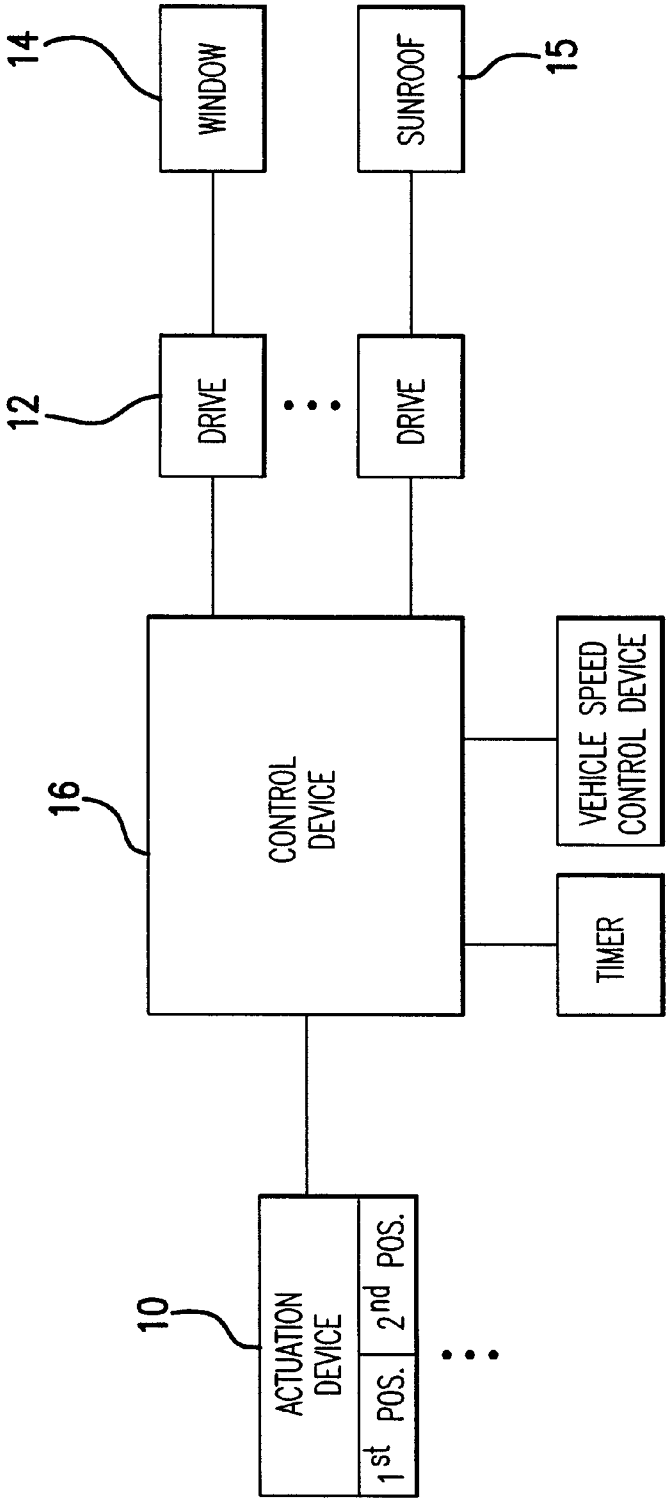
FIG. 2 is a schematic block diagram of the system according to the present invention.

Referring to FIG. 2, the invented system is basically equipped with at least one actuation device 10, a drive device 12 that is allocated to the respectively actuated element (e.g. window 14, sunroof 15) and a control device 16.

The actuation device 10 is preferably a switch with a first and a second switch locking position. The first switch locking position serves the purpose of manual actuation of the window or the sunroof, wherein the element that is to be actuated moves in the desired direction as long as the switch is held in the first locking position. When the switch is moved into the second switch locking position and/or pressed briefly, the element that is to be actuated is opened or closed automatically. However, when the switch is held in the second switch locking position (in closing direction), the emergency function and/or emergency locking procedure is triggered. Furthermore, it is preferred when triggering the emergency function through an actuation device to close all elements that are supposed to be actuated, i.e. all windows as well as possibly also the sunroof. It is also possible to lock the centrally controlled locking system for the doors and the locking device for the trunk by triggering the emergency function.

Figure 1:
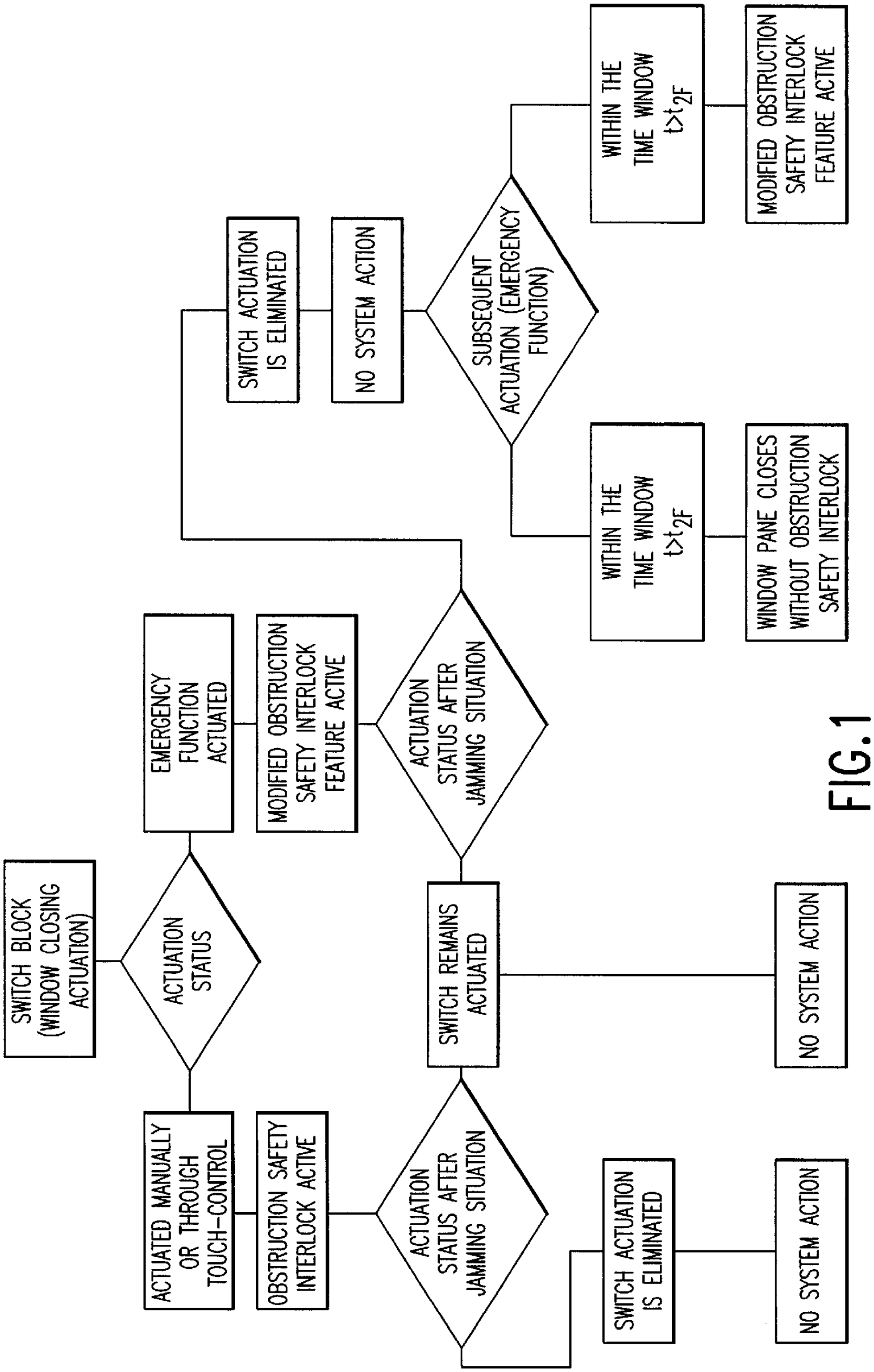
FIG. 1 is a flow chart of the switch logic of the invented emergency locking system and method.

The following describes the operation of the invented emergency locking system and method in connection with the flow chart of FIG. 1. By holding the actuation switch 10 in the second locking position (over-pressing), the emergency function is activated after expiration of a specific period of time $t_A$ that is required for the touch-control function. All windows and sunroofs will be closed at the maximal possible speed. In accordance with the invention, the obstruction safety interlock function is maintained in a modified mode. When an obstruction situation is recognized, the affected window or sunroof reverses by only a considerably shorter path $S_{REV}$ compared to the standard obstruction safety interlock mode, but not completely (e.g. by a path of e.g. 200 mm in some versions). The obstruction and/or the attacker are thus given the opportunity to remove themselves from the danger zone, but not to penetrate further into the interior of the vehicle. In accordance with the present invention, the actuation switch must now be released consciously and actuated again within time window $t_{ZF}$. When the actuation is performed within this time window $t_{ZF}$, the windows and the sunroof are closed at maximum force and speed without any obstruction safety interlock feature. If within the time window $t_{ZF}$ the emergency function is not activated again, i.e. continuous pushing of the switch in the second locking position, then the obstruction safety interlock feature is back in its regular mode and thus fully active. If, however, outside the time window $t_{ZF}$ it is actuated again, with which the emergency function is activated, then the modified obstruction safety interlock feature becomes active. A preferred embodiment also provides for the emergency function to be blocked after a specified driving speed (e.g. 16 km/h), which is determined based on a vehicle speed recording device, in order to provide additional security.

In the currently preferred embodiment of the present invention, the reverse path $S_{REV}$ is about 10 mm in the case of the modified obstruction safety interlock feature, and the time window $t_{ZF}$ is about 4 seconds.

The following describes the operation of the invented emergency system and method again compared to the state of the art based on a concrete example. In this example, the driver wants to close the rear window and actuates the appropriate switch in the driver's door. With the state of the art it can happen that the driver has to hold down the switch for the window to close. In doing so, he unconsciously holds the switch down on the mechanical stop (second locking position) and thus activates the emergency function. According to the state of the art, the window closes at full force without any obstruction safety interlock feature. This can lead to injuries because one passenger may hold his hand out the window while the window closes at full force and may jam the hand. In accordance with the present invention, the window with the obstruction safety interlock feature closes at maximum speed in the same situation. In this instance as well the driver may overlook the fact that one person holds one hand out the window. Based on the invention, however, a jamming situation is recognized automatically, and the window pane reverses by 10 mm and then stops. The person is startled and retracts the hand. Should the driver not have noticed any of this and continue to hold down the switch in the second locking position, the window still remains stopped. In case the driver consciously releases the switch within the time window of 4 seconds and then presses it again and maintains it in the second locking position, the window closes at full force without the obstruction safety interlock feature. If, however, the driver does not actuate the switch again until after the time window of 4 seconds has passed, the window closes with the obstruction safety interlock feature operating.

Accordingly, the invented emergency locking system and method offers considerable safety benefits over the state of the art.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An emergency locking system for securing openings in a motor vehicle, the system comprising:

at least one actuation device;

a control device coupled with said actuation device;

a drive device operatively coupled with said control device, said drive device driving an associated component that closes an opening in the vehicle;

wherein said control device comprises an obstruction safety interlock mechanism, said obstruction safety interlock mechanism being operational in a normal situation and in an emergency situation, a first mode of operation controlling said component in the normal situation in case of an obstruction and a second mode of operation controlling said component in a different manner in case of an obstruction in the emergency situation.

2. The emergency locking system according to claim 1, wherein said actuation device includes a switch having a first switch locking position for manual actuation of the component to be actuated and a second switch locking position, wherein said switch triggers an automatic actuation of the component when switched into the second switch locking position and triggers an emergency mode of operation when manually maintained in the second switch locking position.

3. The emergency locking system according to claim 1, wherein the obstruction safety interlock mechanism closes and locks a plurality of components upon actuation of the actuation device for the emergency mode.

4. The emergency locking system according to claim 2, wherein the obstruction safety interlock mechanism closes and locks a plurality of components upon actuation of the actuation device.

5. The emergency locking system according to claim 1, wherein the obstruction safety interlock mechanism in the first mode of operation reversibly moves the component that closes the opening by at least a 50 mm length in the event an obstruction is detected.

6. The emergency locking system according to claim 2, wherein the obstruction safety interlock mechanism in the first mode of operation reversibly moves the component that closes the opening by at least a 50 mm length in the event an obstruction is detected.

7. The emergency locking system according to claim 3, wherein the obstruction safety interlock mechanism in the first mode of operation reversibly moves the component that closes the opening by at least a 50 mm length in the event an obstruction is detected.

8. The emergency locking system according to claim 1, wherein the obstruction safety interlock mechanism in the second mode of operation reversibly moves the component closing the opening by a length of less than 50 mm when an obstruction is detected.

9. The emergency locking system according to claim 2, wherein the obstruction safety interlock mechanism in the second mode of operation reversibly moves the component closing the opening by a length of less than 50 mm when an obstruction is detected.

10. The emergency locking system according to claim 3, wherein the obstruction safety interlock mechanism in the second mode of operation reversibly moves the component closing the opening by a length of less than 50 mm when an obstruction is detected.

11. The emergency locking system according to claim 5, wherein the obstruction safety interlock mechanism in the second mode of operation reversibly moves the component closing the opening by a length of less than 50 mm when an obstruction is detected.

12. The emergency locking system according to claim 8, wherein the length is approximately 10 mm.

13. The emergency locking system according to claim 9, wherein the length is approximately 10 mm.

14. The emergency locking system according to claim 10, wherein the length is approximately 10 mm.

15. The emergency locking system according to claim 11, wherein the length moved in the second mode is approximately 10 mm.

16. The emergency locking system according to claim 8, wherein the obstruction safety interlock mechanism in the second mode of operation initializes a timer provided in the control device to start a time window upon detecting an obstruction, said obstruction safety interlock mechanism being disabled upon a renewed actuation of the actuation device for the second mode of operation within the time window such that the components completely close the openings.

17. The emergency locking system according to claim 12, wherein the obstruction safety interlock mechanism in the second mode of operation initializes a timer provided in the control device to start a time window upon detecting an obstruction, said obstruction safety interlock mechanism being disabled upon a renewed actuation of the actuation device for the emergency mode of operation within the time window such that the components completely close the openings.

18. The emergency locking system according to claim 16, wherein outside of the time window the obstruction safety interlock mechanism is again enabled in the second mode of operation.

19. The emergency locking system according to claim 1, further comprising:

- a vehicle speed recording device coupled with said control device, wherein said control device disables the second mode of operation of the obstruction safety interlock mechanism when a vehicle speed exceeds approximately 16 km/h.

20. The emergency locking system according to claim 8, further comprising:

- a vehicle speed recording device coupled with said control device, wherein said control device disables the second mode of operation of the obstruction safety interlock mechanism when a vehicle speed exceeds approximately 16 km/h.

21. The emergency locking system according to claim 16, further comprising:

- a vehicle speed recording device coupled with said control device, wherein said control device disables the second mode of operation of the obstruction safety interlock mechanism when a vehicle speed exceeds approximately 16 km/h.

22. A method of operating an emergency locking system in a motor vehicle equipped with powered components for closing openings in the vehicle, the method comprising the acts of:

- detecting an emergency locking situation; and
- deactivating a first mode of operating an obstruction safety interlock mechanism in an event of an obstruction during a closing process for the openings in the vehicle under a normal situation and activating a second, different, mode of operating the obstruction safety interlock mechanism in an event of an obstruction during the emergency locking situation.

23. The method according to claim 22, wherein during the second mode of operation, all components are powered to close and lock the openings in the motor vehicle when an actuation device is actuated.

24. The method according to claim 22, further comprising the act of reversing movement of the component for which an obstruction is detected when in the first mode of operation by a length of at least approximately 50 mm.

25. The method according to claim 23, further comprising the act of reversing movement of the component for which an obstruction is detected when in the first mode of operation by a length of at least approximately 50 mm.

26. The method according to claim 22, wherein upon detecting an obstruction in the second mode of operation, the method reverses movement of the component by a length of less than 50 mm.

27. The method according to claim 23, wherein upon detecting an obstruction in the second mode of operation, the method reverses movement of the component by a length of less than 50 mm.

28. The method according to claim 24, wherein upon detecting an obstruction in the second mode of operation, the method reverses movement of the component by a length of less than 50 mm.

29. The method according to claim 26, wherein the length is approximately 10 mm.

30. The method according to claim 27, wherein the length is approximately 10 mm.

31. The method according to claim 28, wherein the length is approximately 10 mm in the second mode of operation.

32. The method according to claim 26, wherein in the second mode of operation, the method initiates a timer for a specified time window after detecting an obstacle, and wherein within said specified time window the method disables the obstruction safety interlock mechanism upon a renewed actuation of the actuation device such that the components are operated to close the openings in the vehicle.

33. The method according to claim 29, wherein in the second mode of operation, the method initiates a timer for a specified time window after detecting an obstacle and wherein, within said specified time window the method disables the obstruction safety interlock mechanism upon a renewed actuation of the actuation device such that the components are operated to close the openings in the vehicle.

34. The method according to claim 32, wherein outside of said specified time window, the second mode of operation is again enabled upon actuation of the actuation device for an emergency situation.

35. The method according to claim 33, wherein outside of said specified time window, the second mode of operation is again enabled upon actuation of the actuation device for an emergency situation.

36. The method according to claim 22, wherein the method further comprises the act of disabling the second mode of operation of the obstacle safety interlock mechanism when a vehicle speed exceeds approximately 16 km/h.

* * * * *